A. M. ALLEN.
MACHINE FOR COMMINUTING ALFALFA AND LIKE MATERIALS.
APPLICATION FILED OCT. 23, 1908.

969,739.

Patented Sept. 6, 1910.

2 SHEETS—SHEET 1.

WITNESSES

INVENTOR
ADOLPHUS M. ALLEN
BY Paul & Paul
HIS ATTORNEYS

A. M. ALLEN.
MACHINE FOR COMMINUTING ALFALFA AND LIKE MATERIALS.
APPLICATION FILED OCT. 23, 1908.

969,739.

Patented Sept. 6, 1910.

2 SHEETS—SHEET 2.

WITNESSES

INVENTOR
ADOLPHUS M. ALLEN
BY Paul & Paul
HIS ATTORNEYS

UNITED STATES PATENT OFFICE.

ADOLPHUS M. ALLEN, OF MINNEAPOLIS, MINNESOTA, ASSIGNOR TO ALLEN ALFALFA MILL COMPANY, OF MINNEAPOLIS, MINNESOTA, A CORPORATION OF MINNESOTA.

MACHINE FOR COMMINUTING ALFALFA AND LIKE MATERIALS.

969,739.  Specification of Letters Patent.  Patented Sept. 6, 1910.

Application filed October 23, 1908. Serial No. 459,222.

*To all whom it may concern:*

Be it known that I, ADOLPHUS M. ALLEN, of Minneapolis, Hennepin county, Minnesota, have invented certain new and useful Improvements in Machines for Comminuting Alfalfa and Like Materials, of which the following is a specification.

The object of my invention is to provide a machine wherein a fibrous material, such as alfalfa, can be easily and quickly reduced to a finely comminuted state.

A further object, is to provide a machine of comparatively simple construction and one which will have a large capacity and great efficiency.

The invention consists generally in various constructions and combinations, all as hereinafter described and particularly pointed out in the claims.

Figure 1:
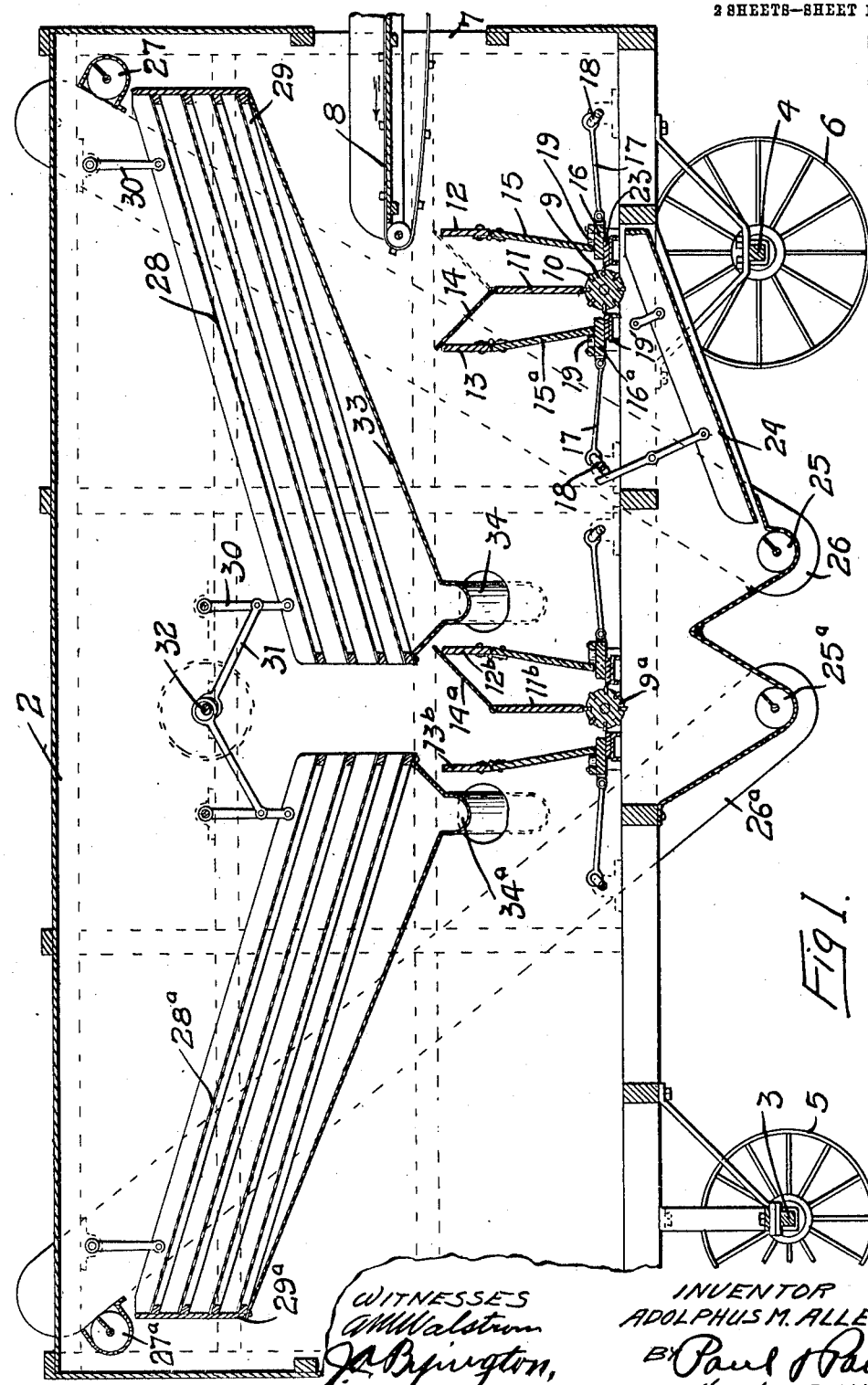
Figure 2:
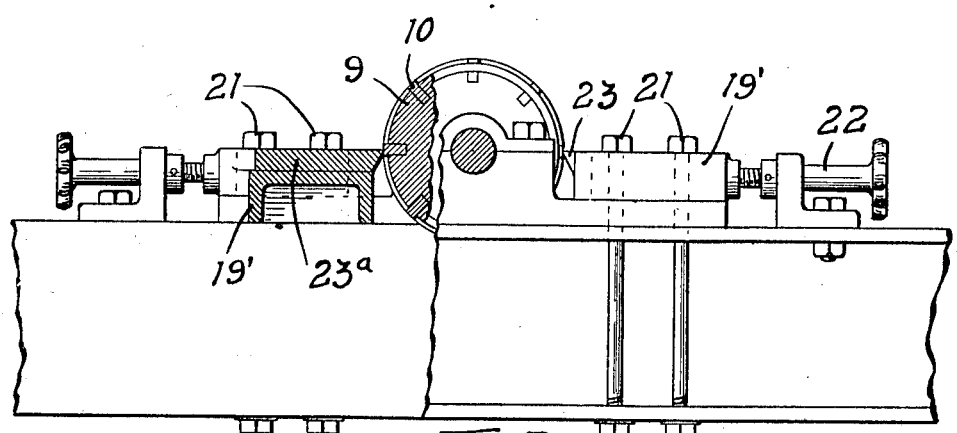
Figure 3:
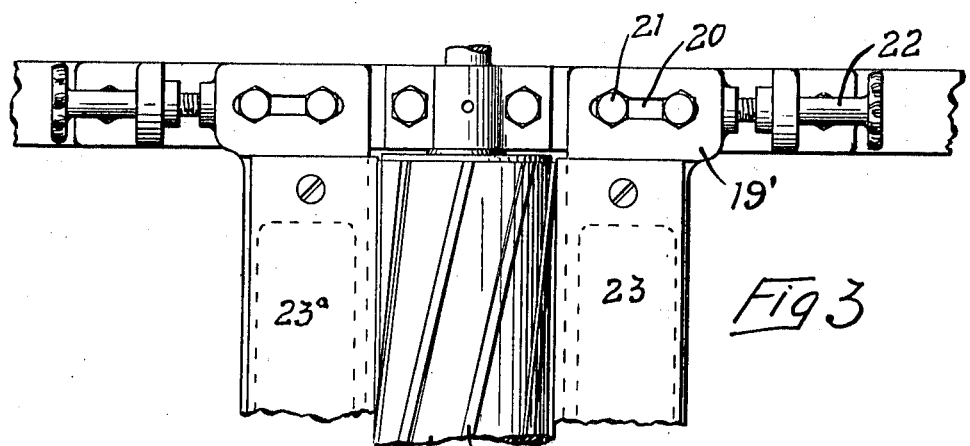
Figure 4:
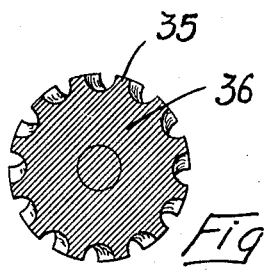
Figure 5:
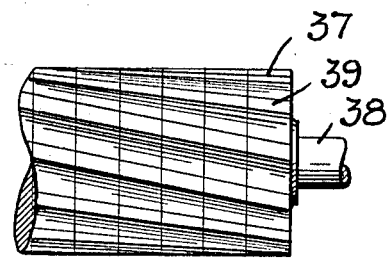

In the accompanying drawings forming part of this specification, Figure 1, is a vertical longitudinal sectional view of a machine embodying my invention, Fig. 2, is a detail sectional view illustrating the means for adjusting the stationary knives with respect to those of the cylinder, Fig. 3, is a plan view of the same, Fig. 4, is a transverse sectional view of a cylinder having integral corrugations extending spirally thereon, Fig. 5, is a detail view illustrating a cylinder made up of a series of disks having spirally formed teeth on their peripheries.

In the drawing, 2 represents a suitable casing having axles 3 and 4 and carrying wheels 5 and 6. At one end of the casing, is an opening 7 through which a carrier 8 projects within the casing, the outer portion of the carrier being near a stack or some other source of supply of the material that is to be comminuted. Within the casing, mounted in suitable bearings, is a cylinder 9 having a series of cutting blades 10 spirally arranged in its periphery, the outer edges of said blades being near the surface of the cylinder and flattened to form cutting edges which coöperate with the edges of the stationary blades to reduce the material fed between them. This cylinder corresponds substantially to the one shown and described in a certain pending application for Letters Patent of the United States, filed by me April 18th, 1908, Serial No. 427,818. Above this cutting cylinder, is a hopper having a centrally arranged division board 11 and side boards 12 and 13 forming the upper outer walls of the hopper and between which boards the material is discharged from the carrier 8. A valve 14 is hinged on the board 11 and arranged to direct the material in front or in the rear of said board as desired. Feed boards 15 and 15$^a$ are hinged to the lower edges of the boards 12 and 13 and depend to a point near the cutting cylinder. Slides 16 and 16$^a$ are located beneath the boards 15 and 15$^a$ and have a reciprocating movement by means of links 17 and crank shafts 18. Springs 19 are interposed between the feed boards 15 and 15$^a$ and the slides 16 and 16$^a$ and tend to hold the said boards with a yielding pressure and cause them to press the material toward the cylinder. The slides are not connected to the feed boards 15 and 15$^a$, but are free to move back and forth independently thereof. The forward movement of the slides will force the material toward the coöperating knives and the backward movement will cause the lower edges of the feed boards to sweep or clean off the material that may have collected on the top of the slides.

The alfalfa or similar material fed into the machine, is comparatively light and incapable of feeding itself satisfactorily and I have found it desirable to provide some such mechanism as the feed boards and the slides, to insure the rapid continuous delivery of the material to the knives. A support 19′ consisting preferably of a casting is provided on each side of the cutter cylinder and is movable toward or from the said cylinder through the medium of slots 20 formed in the supports 19′, bolts 21 and adjusting screws 22, of similar construction to those in general use for adjusting the rolls of mill machinery. Upon the supports 19′, I arrange normally stationary cutter blades 23 and 23$^a$ having their cutting edges in close proximity to the knives of the revolving cylinder, so that the material passing between them, will be reduced to a comminuted condition. The spiral arrangement of the knives in the surface of the cylinder, will cause a shearing cut and the reciprocating movement of the slides 16 and 16ª and the feed boards will insure a uniform continuous delivery of the fibrous material to the knives. When one edge of the knives has been dulled by continued use, the valve 14 may be swung to its other position, the cylinder driven in the opposite direction and the other edge of each knife and the other stationary blade utilized to continue the cutting operation. The knives are provided with double cutting edges and while one set of knives is coöperating with the stationary blade to comminute the material delivered thereto the corresponding edges on the other side of the knives will be ground and reduced to a cutting edge by contact with the stationary blade as they sweep past it. I am therefore able to grind one cutting edge while the other edge is doing its work. When the cylinder is revolving in one direction, the slide on the opposite side from that toward which the cylinder is revolving will be in-operative and will be drawn back away from the cylinder. In this way, I am able to operate the cylinder continuously without stopping to grind the knives. The outer faces of the knives are, when ready for use, substantially flat, forming cutting edges at the corners or on each longitudinal edge of the knife blade. As the cutting edge becomes rounded by the operation of the cylinder, particularly at the point where the cutting action takes place, the flattened face of the knife will gradually wear, thus reducing the diameter of the cutting cylinder and causing the other cutting edge of the knife to become sharp. This is due to the wear of the knife blades upon the edge of the stationary blade and the engagement with the material between them. Upon revolving the cylinder in the opposite direction the rounder edge will be gradually flattened again until a cutting edge is once more formed. I am thus able to render the knives usable after being dulled by revolving the cylinder in the opposite direction and without the necessity of stopping the machine to grind the knives.

Beneath the cylinder, is a spout 24 to which the material from the cutting cylinder is delivered. A transverse screw conveyer 25 receives the material from the spout 24 and delivers it to a repeat elevator 26 arranged at one side of the machine. The repeat elevator delivers the material to a transverse screw conveyer 27 located in the upper part of the casing above the carrier 8 and from which the material passes on to sieves 28 mounted in a shoe 29 that is suspended on links 30 and is vibrated through the connection of a pitman 31 with an eccentric shaft 32. A pan 33 is provided beneath the series of sieves 28 and a spout 34 receives the fine material from said sieves and delivers it to a suitable receptacle on the outside of the machine. The tailings from the sieve 28 pass into a hopper 28ª corresponding substantially to the one heretofore described.

A cutting cylinder corresponding to the one described, is provided in the bottom of said hopper which I will designate by numeral 9 with the exponent "a", and the feeding devices employed in connection with this cylinder are substantially the same as those referred to above, and need no detailed description herein. The material from the cylinder 9ª falls into a transverse conveyer 25ª and is delivered to a repeat elevator 26ª which in turn discharges into a transverse conveyer 27ª located in the upper portion of the casing. Sieves 28ª receive the material from said last named conveyer and are agitated through the vibration of the shoe 29ª wherein said sieves are mounted. A spout 34ª discharges the fine material outside the machine and one side of the hopper above the cylinder 9ª receives the tailings from the sieves 28ª, the valve 14ª having previously been adjusted for that purpose. These cylinders and sieves may be duplicated as many times as desired until the material is properly reduced.

With this apparatus, I am able to take the alfalfa or other fibrous material and pass it continuously through the machine until it is delivered in a finely comminuted state ready for the market.

I have shown a cylinder with a series of knives mounted in its periphery corresponding to those of my pending application above referred to, but instead of constructing the cylinder this way, I may provide one as indicated in Fig. 4, wherein the cutter blades or knives 35 are formed spirally and integrally on the surface of the cylinder 36. These knives will have double cutting edges, either one being rendered operative according to the direction of revolution of the cylinder. I may also construct a cylinder of a series of disks 37 mounted on a shaft 38 and having spiral teeth 39 thereon provided with cutting edges. These disks may be set so that the teeth of adjoining disks will be in alinement with one another and extend lengthwise and spirally with respect to the shaft on which they are mounted. Any suitable means may be provided for clamping or securing the disks on the shaft. The material, such as alfalfa fed to this revolving cylinder, is too light and fluffy to feed through its own weight and I have found it preferable to employ the force feed device to insure the rapid continuous delivery to the knives. The cylinder revolving at a high speed, would, if the hopper contained only one compartment, tend to blow the material upwardly and away from the knives. The division board provided above the cylinder, has the function of spreading or scattering the blast of air and causing the compartment on one side of the board to serve as a flue or passage for the air blast, while the material to be comminuted, is passing down to the knives on the opposite side of the board and without being affected by the blasts of air from the cylinder.

I claim as my invention:

1. The combination with a revolving cylinder, having a series of spirally arranged peripheral knives provided with double cutting edges, normally stationary knives arranged upon opposite sides of said cylinder and coöperating with said peripheral knives, a hopper with a dividing wall, a valve arranged to direct material to either side of said wall, the walls of said hopper having vibrating sections for forcing the material therein toward said knives, and means whereby either one of said vibrating sections may be rendered operative according to the direction of revolution of said cylinder.

2. The combination, with a revolving cylinder having a series of spirally arranged corrugations thereon, said corrugations having flattened outer faces and square corners forming cutting edges extending from end to end of the corrugations, stationary knives arranged upon opposite sides of said cylinder and coöperating with the cutting edges of said corrugations, said cylinder being capable of revolving in either direction, and one of said stationary knives coöperating with the edges of said corrugations on one side thereof when said cylinder is revolved in one direction, and the other stationary knife coöperating with the other cutting edges of said corrugations when said cylinder is revolved in the other direction, and means for feeding material on both sides of said cylinder.

3. The combination with a revolving cylinder having spirally arranged peripheral knives, of a stationary knife, a hopper, a hinged feed board, means for yieldingly holding said feed board toward said cylinder and a reciprocating slide operating toward and from said cylinder and contacting with the lower edge of said feed board to reciprocate the same and said feed board serving to sweep off the material from said slide on the outward stroke of said slide, substantially as described.

4. The combination with a revolving cylinder, and spirally arranged peripheral knives therein, of stationary knives provided upon opposite sides of said cylinder, a hopper above said cylinder, feed boards forming the outer walls of said hopper and yieldingly held toward said cylinder, a division board provided in said hopper and slides operating horizontally beneath said feed boards and independent thereof, for the purpose specified.

5. The combination, with a revolving cylinder having a series of peripheral knives provided with double cutting edges formed at the junction of the substantially flat faces of said knives and the side faces thereof, said side and outer faces being in planes at right angles substantially to one another, and said cutting edges being located close to the peripheral surface of said cylinder, and stationary knives provided upon opposite sides of said cylinder and having a shear cut with said cylinder knives.

6. The combination, with a revolving cylinder having a series of peripheral knives, the outer faces of said knives being substantially flat and coöperating with the side faces of said knives to form double cutting edges, said outer and side faces being in planes substantially at right angles to one another, stationary knives provided on each side of said cylinder and coöperating with said cylinder knives to form a shear cut, the contact of the outer faces of said knives with the stationary knife serving to flatten said outer faces when a longitudinal cutting edge has been rounded by continued use, and said flattening action reducing said rounded edge and permitting the sharpening of the edges on one side of said knives while the opposite edges are in use, substantially as described.

7. The combination, with a revolving cylinder having a series of peripheral knives provided with flattened outer faces and longitudinal cutting edges between said outer faces and the side faces of said knives, said outer and side faces of the knives forming substantially square corners thereon, a stationary knife located contiguous to said cylinder knives and coöperating therewith to form a shear cut, a hopper, and a reciprocating slide operating above said knives to force the material into the path of said cylinder knives.

8. The combination, with a cylinder having a series of peripheral knives formed by a series of grooves extending lengthwise of said cylinder and spirally therein, the outer faces of said knives being flattened and coöperating with the side faces thereof to form longitudinal cutting edges extending spirally lengthwise of said cylinder, stationary knives arranged upon each side of said cylinder and extending lengthwise thereof and adjacent to said cylinder knives, said stationary knives being parallel substantially with the axis of said cylinder and having a shear cut respectively with said cylinder knives when said cylinder is operated in either direction.

9. The combination, with a revolving cylinder and a series of spirally arranged peripheral knives having cutting edges, a stationary knife coöperating with said peripheral knives, the cutting edges of said peripheral knives being formed at the intersection of the substantially flat side of each knife and its outer face, said cutting edge being maintained by the grinding of said outer face, and means for feeding material into the path of said peripheral knives.

In witness whereof, I have hereunto set my hand this 20th day of October 1908.

ADOLPHUS M. ALLEN.

Witnesses:
 RICHARD PAUL,
 J. A. BYINGTON.